(12) United States Patent
Jansen et al.

(10) Patent No.: US 7,935,020 B2
(45) Date of Patent: May 3, 2011

(54) INTEGRATED MEDIUM-SPEED GEARED DRIVE TRAIN

(75) Inventors: Patrick L. Jansen, Scotia, NY (US); Ralph James Carl, Jr., Clifton Park, NY (US); Robert J. Ciszak, Fairview, PA (US); Fulton J. Lopez, Clifton Park, NY (US); Aniruddha D. Gadre, Rexford, NY (US)

(73) Assignee: General Electric Company, Schenectady, NY (US)

( * ) Notice: Subject to any disclaimer, the term of this patent is extended or adjusted under 35 U.S.C. 154(b) by 918 days.

(21) Appl. No.: 11/845,277

(22) Filed: Aug. 27, 2007

(65) Prior Publication Data
US 2009/0058094 A1    Mar. 5, 2009

(51) Int. Cl.
*F16H 57/08* (2006.01)
(52) U.S. Cl. ........................... 475/338; 475/347
(58) Field of Classification Search .................. 475/338, 475/346, 347
See application file for complete search history.

(56) References Cited

U.S. PATENT DOCUMENTS

| | | | |
|---|---|---|---|
| 5,663,600 A | 9/1997 | Baek et al. | |
| 6,420,808 B1 | 7/2002 | Hosle | |
| 6,459,165 B1 | 10/2002 | Schoo | |
| 6,872,049 B2 | 3/2005 | Christensen | |
| 7,154,191 B2 | 12/2006 | Jansen et al. | |
| 7,154,193 B2 | 12/2006 | Jansen et al. | |
| 7,180,204 B2 | 2/2007 | Grant et al. | |
| 2006/0071575 A1* | 4/2006 | Jansen et al. | 310/266 |
| 2006/0205557 A1 | 9/2006 | Arndt et al. | |
| 2007/0075548 A1 | 4/2007 | Bagepalli et al. | |
| 2007/0265133 A1* | 11/2007 | Smook | 475/317 |

\* cited by examiner

*Primary Examiner* — Edwin A. Young
(74) *Attorney, Agent, or Firm* — James W. Pemrick; Ernest G. Cusick; Frank A. Landgraff

(57) ABSTRACT

A drive train for a wind turbine is provided. The wind turbine comprises a low speed shaft connected to blades of the wind turbine and a higher speed shaft connected to a generator. The drive train also includes a bearing that substantially supports the weight of at least the low speed shaft. A compound planetary gear stage is connected to the low speed shaft and the higher speed shaft, and includes a rotating carrier, a non-rotating ring gear, a plurality of planetary gears, and a rotating sun gear. The sun gear is connected to the higher speed shaft.

18 Claims, 3 Drawing Sheets

INTEGRATED MEDIUM-SPEED GEARED DRIVE TRAIN

BACKGROUND OF THE INVENTION

The apparatus described herein relates generally to a drive train for a wind turbine. More specifically, the apparatus relates to an integrated medium-speed geared drive train for a wind turbine having a non-rotating ring gear.

Recently, wind turbines have received increased attention as environmentally safe and relatively inexpensive alternative energy sources. Wind turbines do not emit greenhouse gases (GHGs), and therefore, do not contribute to global warming. With the growing interest in wind generated electricity, considerable efforts have been made to develop wind turbines that are reliable and efficient.

Wind is usually considered to be a form of solar energy caused by uneven heating of the atmosphere by the sun, irregularities of the earth's surface, and rotation of the earth. Wind flow patterns are modified by the earth's terrain, bodies of water, and vegetation. The terms wind energy or wind power, describe the process by which the wind is used to rotate a shaft and subsequently generate mechanical power or electricity.

Typically, wind turbines are used to convert the kinetic energy in the wind into mechanical power. This mechanical power may be used for specific tasks (such as grinding grain or pumping water) or a generator may convert this mechanical power (i.e., the rotation of a shaft) into electricity. A wind turbine usually includes an aerodynamic mechanism (e.g., blades) for converting the movement of air into a mechanical motion (e.g., rotation), which is then converted with a generator into electrical power. Power output from the generator is proportional to the cube of the wind speed. As wind speed doubles, the capacity of wind generators increases almost eightfold.

The majority of commercially available wind turbines utilize geared drive trains to connect the turbine blades to the electrical generators. The wind turns the turbine blades, which spin a low speed shaft, which feeds into a gearbox having a higher speed output shaft. This higher speed output shaft connects to a generator and makes electricity. The geared drive aims to increase the velocity of the mechanical motion.

The majority of geared drive trains in existing wind turbines of ratings >1 MW utilize 3 gear stages to achieve gear ratios ranging from about 1:70 up to about 1:110. The three stages typically comprise a simple planetary or epicylic first stage, followed by two parallel offset stages (bull-gear+pinion gears) or a second simple planetary stage followed by a one parallel offset stage. The high gear ratio enables a generator that is substantially smaller and lower cost than the gearbox. The relatively high-speed of the generator forces the generator to have an aspect ratio that is longer than it is wide, with radial-vented cooling. The high-speed output shaft of the gearbox is generally not concentric with the low-speed input shaft of the gearbox. For these reasons, the generator is mounted separate from the gearbox, thereby requiring additional couplings, support frames, and generator frame mass.

With the advent of cost-effective high-efficiency permanent magnet (PM) synchronous generators, the combination of a 3-stage gearbox and separately mounted high-speed generator is no longer the optimal configuration in terms of system mass, size, cost, and efficiency. For example, gearboxes, unlike most generators, are typically a major source of unreliability and unavailability in current wind turbines. Furthermore, the high-speed gear stage often creates unacceptable acoustic noise that radiates from the wind turbine.

A more optimal configuration of a geared drive train is therefore strongly desired by the wind industry to provide increased reliability and availability, reduced cost, reduced mass and size, and increased efficiency.

BRIEF DESCRIPTION OF THE INVENTION

A drive train for a wind turbine is provided. The wind turbine comprises a low speed shaft connected to blades of the wind turbine and a higher speed shaft connected to a generator. The drive train also includes a bearing that substantially supports the weight of at least the low speed shaft. A compound planetary gear stage is connected to the low speed shaft and the higher speed shaft, and includes a rotating carrier, a non-rotating ring gear, a plurality of planetary gears, and a rotating sun gear. The sun gear is connected to the higher speed shaft.

Further, according to additional aspects of the present invention, a drive train for a wind turbine is provided having a low speed shaft connected to blades of the wind turbine and a higher speed shaft connected to a generator. The drive train includes main bearing means for substantially supporting the weight of at least said low speed shaft. The main bearing means is comprised of at least two separate bearings axially spaced along the low speed shaft. A compound planetary gear stage is connected to the low speed shaft and the higher speed shaft. The compound planetary gear stage comprises a rotating carrier, a non-rotating ring gear, a plurality of planetary gears, and a rotating sun gear. The sun gear is connected to the higher speed shaft.

DETAILED DESCRIPTION OF THE INVENTION

Figure 1:
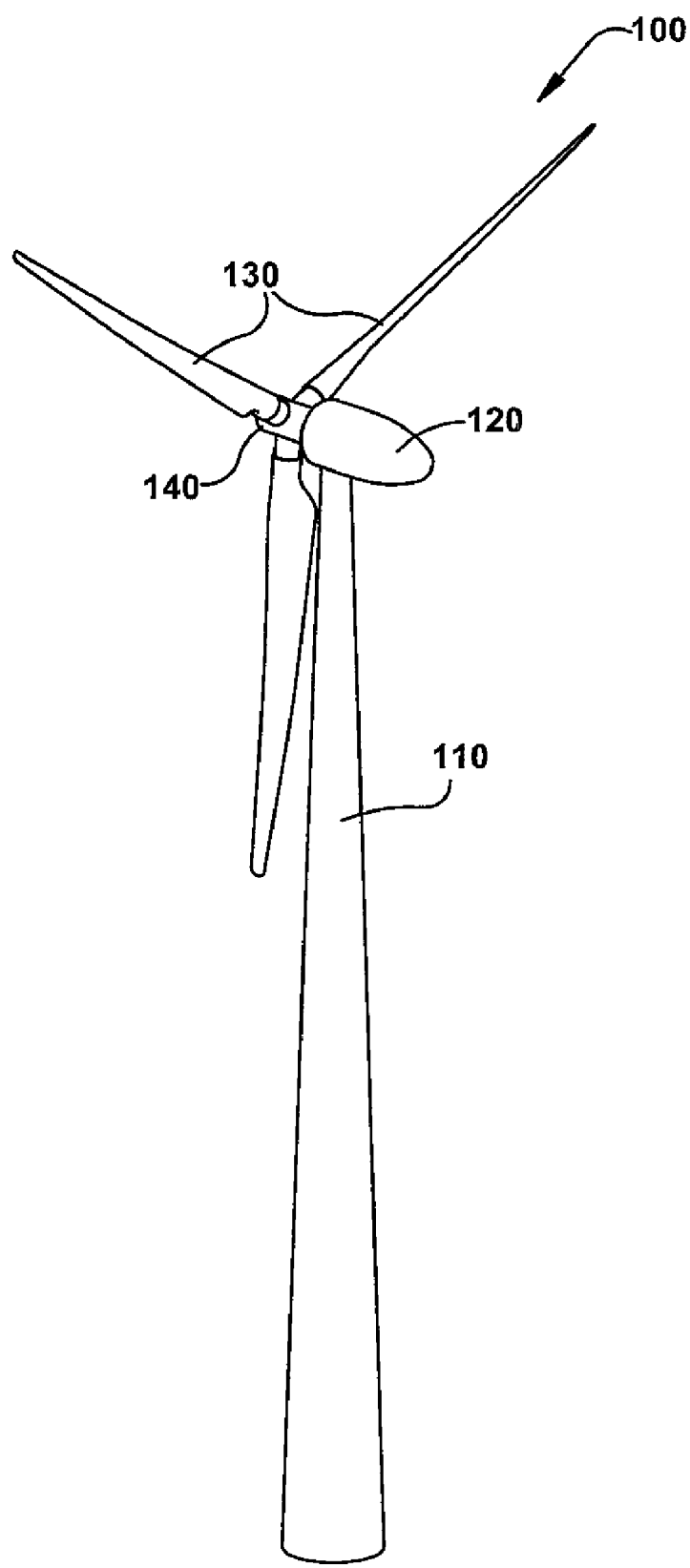
FIG. 1 is a perspective illustration of an exemplary wind turbine.

A typical commercial horizontal axis wind turbine (HAWT) 100 is illustrated in FIG. 1. The wind turbine 100 may include a tubular tower 110, which is often manufactured of steel. The tower 110 may be erected by stacking multiple tower segments on top of each other. The tower 110 supports the weight of the nacelle 120, blades 130 and hub 140. Towers may also be of the lattice (or truss) type, and tubular towers may alternatively be formed of concrete. The nacelle 120 typically houses the drive train (e.g., gearbox, shafts, couplings, generator, etc.), as well as the main frame (also called bedplate) and yaw drives. Other items such as the control electronics may be housed within the nacelle 120 as well. Typically, the nacelle 120 has an outer skin that is comprised of a lightweight material such as fiberglass or a graphite composite. The main function of the nacelle skin is to protect the contents from the elements (e.g., rain, ice, snow, etc.).

The blades 130 are connected to the hub 140, and the hub may contain a pitch control mechanism to control the pitch angle of each blade. Typically, three blades are employed in most commercial wind turbines, however, one, two or four or more blades could be employed as well. The blades convert the kinetic energy of the wind into mechanical energy by rotating a low speed shaft. Blades may be manufactured from fiberglass or graphite composites, fiberglass reinforced plastics or wood/epoxy laminates, or other suitable materials. The low speed shaft is connected to the hub 140 typically via a bolted flange coupling.

Typically, in turbines greater than 1 MW, the low speed shaft will rotate at a variable speed depending upon the wind speed, from zero up to a maximum steady-state speed being generally the rated speed of the turbine whereby the turbine is producing rated power. The rated rotation speed at the rated power of the turbine is a function of power rating, blade length, wind class, etc. and will vary typically from about 18 to about 22 RPM for a 1.5 MW turbine down to about 14 to about 16.5 RPM for a 2.5 MW turbine. Rated rotation speeds of the low speed shaft can vary above or below these ranges as well.

Generators are used to convert the rotation of a shaft into electrical energy. A gearbox is typically used to increase the speed of the input shaft to the generator. The gearbox has the low speed shaft as its input, and the output is a higher speed shaft, which according to aspects of the present invention, can feed directly into the generator.

Figure 2:
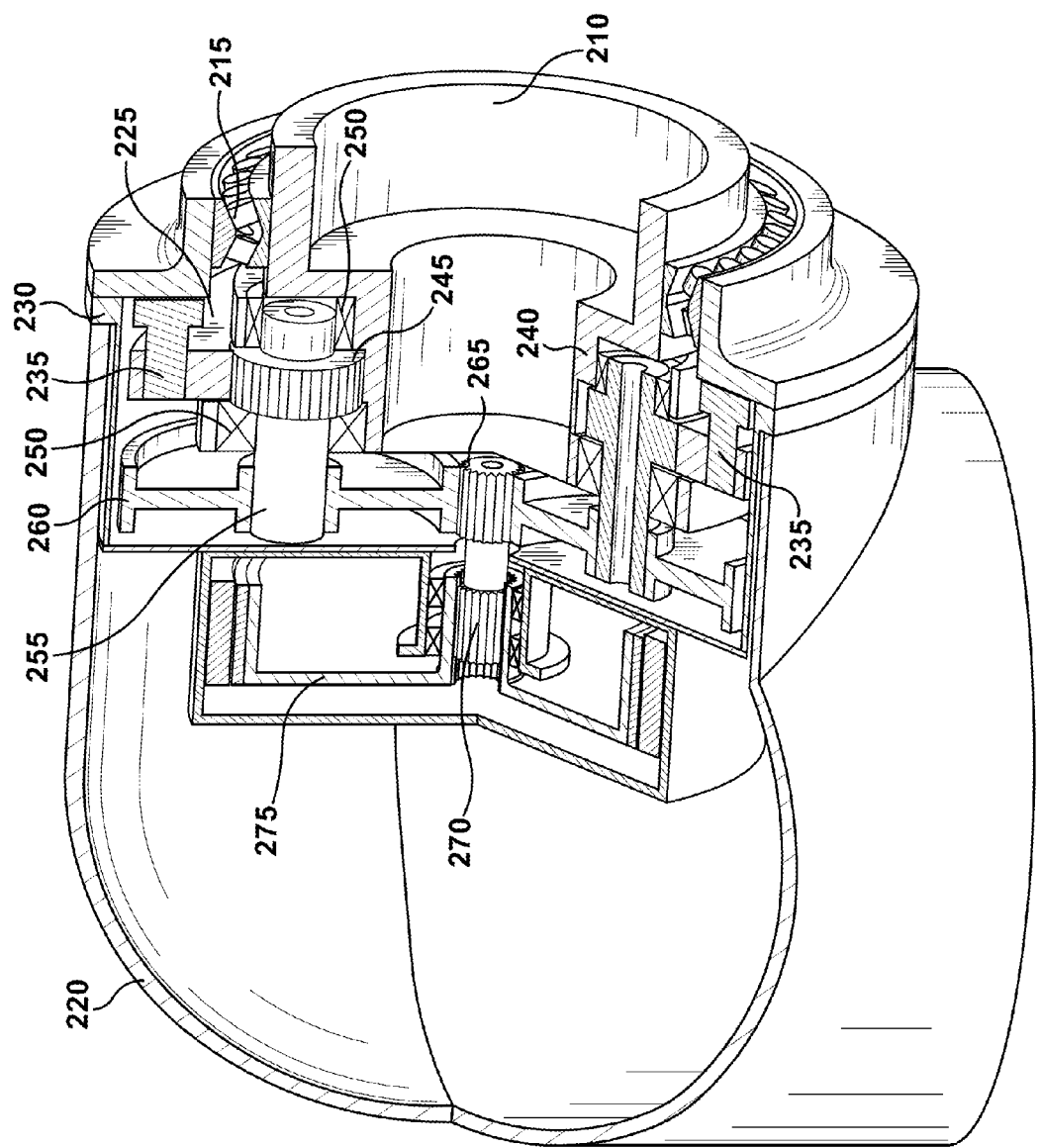
FIG. 2 is a partial, cut-away perspective illustration of one embodiment of a drive train that could be used in the wind turbine of FIG. 1.

A partial, cross-sectional view of the drive train, as embodied by the present invention, is illustrated in FIG. 2. The drive train gearbox is of the compound planetary, also referred to as compound epicyclic type.

The hub 140 (not shown in FIG. 2) attaches to the hub flange mount 210. The blades 130, hub 140 and hub flange mount 210 all rotate together, and typical speeds range as indicated above for the low-speed shaft. The hub flange mount 210 connects to the main bearing 215 either directly or through a low speed shaft. In some embodiments, the low speed shaft comprises no more than the hub flange mount 210, the main bearing 215 mounting surface, and the connection to the carrier 240. The hub flange mount 210 could also connect directly to the carrier 240.

The hub flange mount 210 can also be integrated with the main bearing 215, such that the main bearing takes on the additional role of mounting the hub; i.e., the hub is directly mounted to the main bearing (e.g., a single large diameter main bearing) via a bolted connection to the main bearing inner race (via bolt holes or threaded studs in the inner race). Likewise, the main bearing inner race can also connect directly with the carrier via a similar or common bolted connection. In some of these embodiments, the main bearing inner race effectively becomes the low-speed shaft.

In one aspect of the present invention, main bearing 215 can be a single, large diameter double tapered roller bearing. The main bearing 215 is in turn rigidly connected to the nacelle main frame 220. In another aspect of the present invention, the low speed shaft could be supported by two separate roller bearings. Bearings can be of the ball bearing, spherical, cylindrical, tapered roller bearing or double tapered roller bearing type.

The main frame 220 can be connected to the wind turbine tower 110 through a set of yaw bearings (not shown) and yaw drives (not shown) in a conventional manner. The loads (i.e., moments and forces) created by the wind, and impressed upon the rotor blades 130 and hub 140, are transmitted from the hub flange mount 210, through the main bearings 215, and then through the main frame 220 to the tower 110 and finally to the ground.

A large diameter ring gear 225 can be attached to the main frame near the main bearings mounting plate 230 via flexible or elastic mounts 235. The flexible mounts 235 prevent rotation of the ring gear 225, but allow the ring gear 225 to move slightly in both lateral and axial directions. The flexible mounts 235 decouple the useful torque created by the wind on the blades 130 from the undesirable wind loads (i.e., forces and moments) that cause deflections of the main frame 220.

A carrier 240 is attached to the hub flange mount 210, and both the carrier 240 and hub flange mount 210 rotate at the same speed as the hub 140. The carrier 240 contains three pinion gears 245 and pinion shaft bearings 250. Bearings 250 can be of the roller or ball type. The pinion gears 245 are each mounted to a pinion shaft 255 that drives a planetary gear 260. In one aspect of the present invention, planetary gears 260 have a larger diameter than the pinion gears 245. In alternative embodiments, one to six or more pinion gears could be contained within carrier 240, as well as planetary gears 260.

Planetary gears 260 mesh with a sun gear 265. The sun gear 265 is connected to and drives an output shaft 270 which may feed directly into generator 275. Output shaft 270 can be referred to as a higher speed shaft and rotates at a higher rpm speed than the hub flange mount 210. In the course of normal operation of wind turbine 100, the hub flange mount 210 may rotate in a range from zero up to the rated speed of the turbine; e.g., about 14 to about 16.5 RPM for a 2.5 MW turbine. The gearbox, according to aspects of the present invention, increases this speed by a factor of about 8 to 30, and this corresponds to the gearbox having a gear ratio of between about 1:8 to about 1:30. For a 2.5 MW turbine, for example, the output shaft (i.e., the higher speed shaft) may rotate at a rated speed in the range from about 100 to about 500 rpm. Output shaft 270 may also have speeds above and below this range as envisioned by additional aspects of the present invention.

The total gear ratio is the product of the ring 225/pinion 245 gear ratio and the planet 260/sun 265 gear ratio, plus one due to the rotation of the carrier 240. The combination of the fixed ring gear and the rotating carrier adds one to the gear ratio of this compound epicyclic/planetary gearbox. This is an important feature in that it enables the use of a smaller generator, which results in less overall weight supported by tower 110.

A permanent magnet (PM) synchronous generator 275 designed to be operated by a generator input shaft rotating in the hundreds of rpm's may be used with the gearbox of the present invention. A compact and lightweight drive train package can be obtained by mounting the generator 275 integral with the gearing previously described. The higher speed output shaft of the gearbox can feed directly into the generator 275. In some embodiments of the present invention, the output shaft 270 of the gearbox could be spline fit (not shown) to the rotor of the generator. The spline fit arrangement allows the gearbox to transmit torque, but also allows some freedom of movement in the axial and pitch directions. The sun gear 265 could also be allowed to "float" within the planetary gears 260.

Compared to conventional geared drive trains with three-stage gearboxes, the compound planetary gearing with the elimination of a third high-speed gear stage can provide 1% or more increased efficiency and corresponding annual energy production of the wind turbine. Furthermore, the acoustic noise associated with the high-speed gear stage is completely eliminated.

Figure 3:
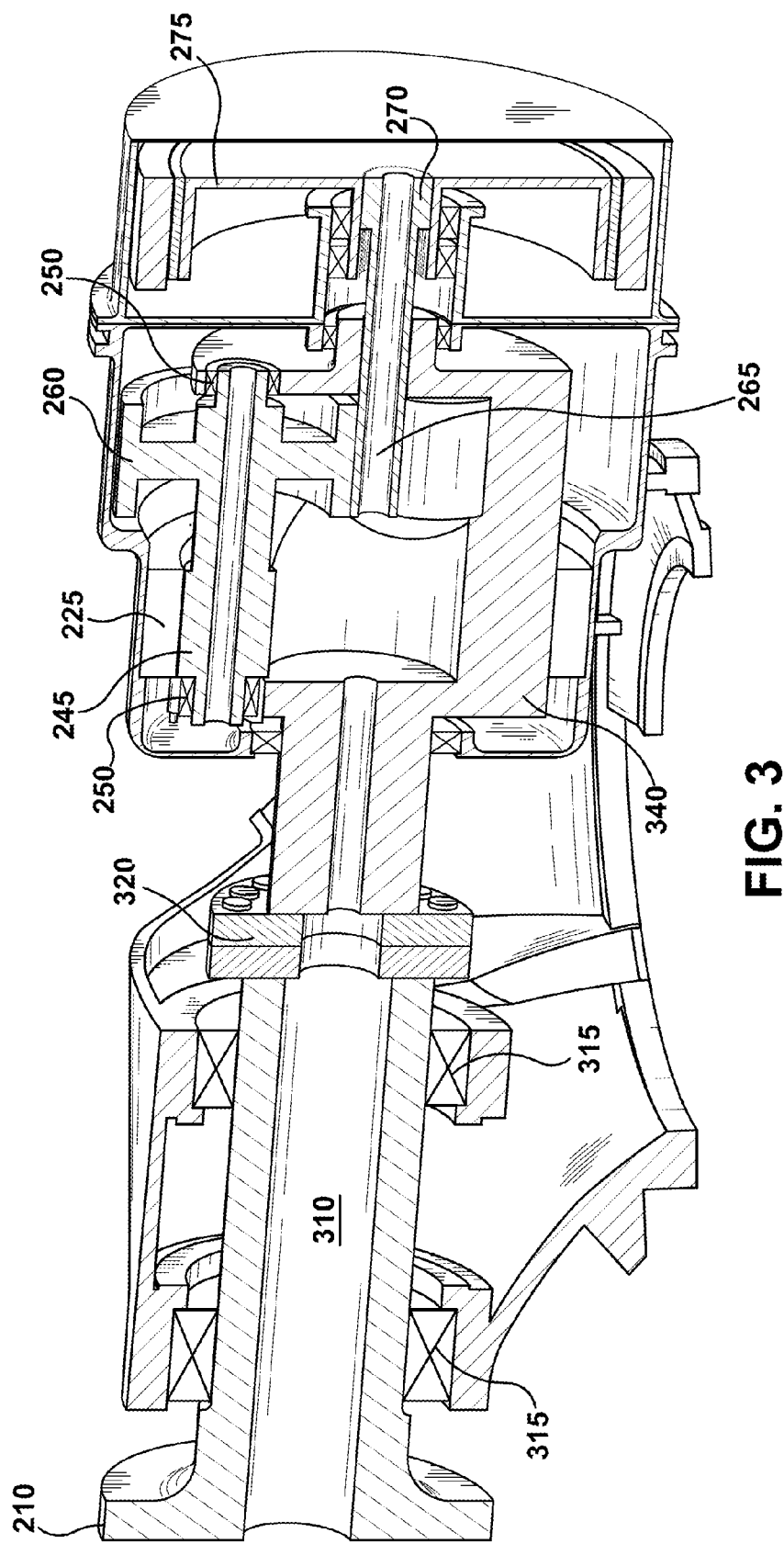
FIG. 3 is a partial, cut-away perspective illustration of another embodiment of a drive train that could be used in the wind turbine of FIG. 1.

FIG. 3 illustrates another embodiment of the present invention. The single, large diameter double tapered roller bearing 215 of FIG. 2 has been replaced by two separate and axially spaced main bearings 315. Main bearings 315 are axially spaced from each other along low speed shaft 310. The main bearings 315 could be a combination of roller bearings, ball bearings, cylindrical or individual tapered or double tapered roller bearings. A common configuration is a double-tapered roller bearing in the forward position (closest to the hub 140), and a cylindrical roller bearing in the aft position (furthest from the hub 140). The low speed shaft 310 is connected via hub flange mount 210 to the hub 140 and blades 130 of wind turbine 100. Accordingly, low speed shaft 310 is driven by the wind turning blades 130. In an alternative embodiment (not illustrated) the aft bearing is located integral within the gearbox housing.

Low speed shaft 310 is optionally connected to carrier 340 through a torque transmitting coupling 320. Coupling 320 is preferably formed of a partially flexible or elastomeric material and designed to absorb some misalignment (e.g., radial and axial movement) of low speed shaft 310 relative to the carrier 340. In this manner, coupling 320 has some similar characteristics to the flexible mount 235 of FIG. 2.

The stator of the generator 275 could be mounted outside of the generator rotor, or in alternative embodiments, the rotor could be mounted outside of the stator. A PM synchronous generator has been described, but induction generators, wound-field synchronous generators, or electrically excited generators such as doubly-fed asynchronous generators could be used as well. A wind turbine employing a single generator has been described, but it is to be understood that multiple generators could also be used with modifications to the gearbox.

A housing can support and/or enclose the gear stage (i.e., gearbox) and/or the generator. An integrated unit can be obtained by enclosing the gearbox and the generator in a multi-piece or unitary housing.

While various embodiments are described herein, it will be appreciated from the specification that various combinations of elements, variations or improvements therein may be made, and are within the scope of the invention.

What is claimed is:

1. A drive train for a wind turbine, said wind turbine comprising a low speed shaft connected to blades of the wind turbine and a higher speed shaft connected to a generator, said drive train comprising:
    a bearing substantially supporting the weight of at least said low speed shaft;
    a compound planetary gear stage; said compound planetary gear stage connected to said low speed shaft and said higher speed shaft, said compound planetary gear stage comprising,
      a rotating carrier;
      a non-rotating ring gear attached to at least one of a main bearings mounting plate and a main frame of the wind turbine;
      a plurality of planetary gears; and
      a rotating sun gear connected to said higher speed shaft; and
    one or more elastic mounts attached directly to the non-rotating ring gear and at least one of the main bearings mounting plate and the main frame, the one or more elastic mounts decoupling at least a portion of, at least one of, axial and lateral forces impressed upon the wind turbine, the axial and lateral forces created by wind impinging on the blades of the wind turbine.

2. The drive train as defined in claim 1, further comprising:
    a plurality of pinion planetary gears contained within a portion of said rotating carrier, said plurality of pinion planetary gears connected via shafts to said plurality of planetary gears;
    wherein, said plurality of pinion planetary gears mesh with said non-rotating ring gear, and said rotating sun gear meshes with and is driven by said plurality of planetary gears.

3. The drive train as defined in claim 2, wherein said bearing is a single double tapered roller bearing.

4. The drive train as defined in claim 2, wherein said bearing comprises two bearings, said bearings axially spaced along said low speed shaft.

5. The drive train as defined in claim 2, wherein said bearing comprises a single rowed tapered bearing or a combination of a double-tapered roller bearing and a cylindrical roller bearing.

6. The drive train as defined in claim 2, wherein said generator is a permanent magnet synchronous generator, and said higher speed shaft rotates at a rated speed between about 140 to about 400 revolutions per minute.

7. The drive train as defined in claim 6, wherein said low speed shaft rotates between about zero to about 22 revolutions per minute.

8. The drive train as defined in claim 6, wherein said compound planetary gear stage has a gear ratio of between about 1:8 to about 1:30.

9. The drive train as defined in claim 1, further comprising a gear stage housing supporting and/or enclosing, at least one or both of, said compound planetary gear stage and said generator.

10. A drive train for a wind turbine, said wind turbine comprising a low speed shaft connected to blades of the wind turbine and a higher speed shaft connected to a generator, said drive train comprising:
    main bearing means for substantially supporting the weight of at least said low speed shaft, said main bearing means comprised of at least two separate bearings axially spaced along said low speed shaft; and
    a compound planetary gear stage; said compound planetary gear stage connected to said low speed shaft and said higher speed shaft, said compound planetary gear stage comprising,
      a rotating carrier;
      a non-rotating ring gear;
      a plurality of planetary gears; and
      a rotating sun gear connected to said higher speed shaft;
    an elastic coupling means for connecting the rotating carrier to the low speed shaft, the elastic coupling means decoupling at least a portion of, at least one of, axial and lateral forces impressed upon the wind turbine, the axial and lateral forces created by wind impinging on the blades of the wind turbine.

11. The drive train as defined in claim 10, further comprising:
    a plurality of pinion planetary gears contained within a portion of said rotating carrier, said plurality of pinion planetary gears connected via shafts to said plurality of planetary gears;
    wherein, said plurality of pinion planetary gears mesh with said non-rotating ring gear, and said rotating sun gear meshes with and is driven by said plurality of planetary gears.

12. The drive train as defined in claim 10, wherein said main bearing means are roller bearings.

13. The drive train as defined in claim 10, wherein said main bearing means are tapered roller bearings.

14. The drive train as defined in claim 10, wherein said main bearing means are double tapered roller bearings.

15. The drive train as defined in claim 10, wherein said generator is a permanent magnet synchronous generator, and said higher speed shaft rotates between about 140 to about 400 revolutions per minute.

16. The drive train as defined in claim 15, wherein said low speed shaft rotates between about zero to about 22 revolutions per minute.

17. The drive train as defined in claim 10, wherein said compound planetary gear stage has a gear ratio of between about 1:8 to about 1:30.

18. The drive train as defined in claim 10, further comprising a gear stage housing supporting and/or enclosing, at least one or both of, said compound planetary gear stage and said generator.

* * * * *